Figure 1:
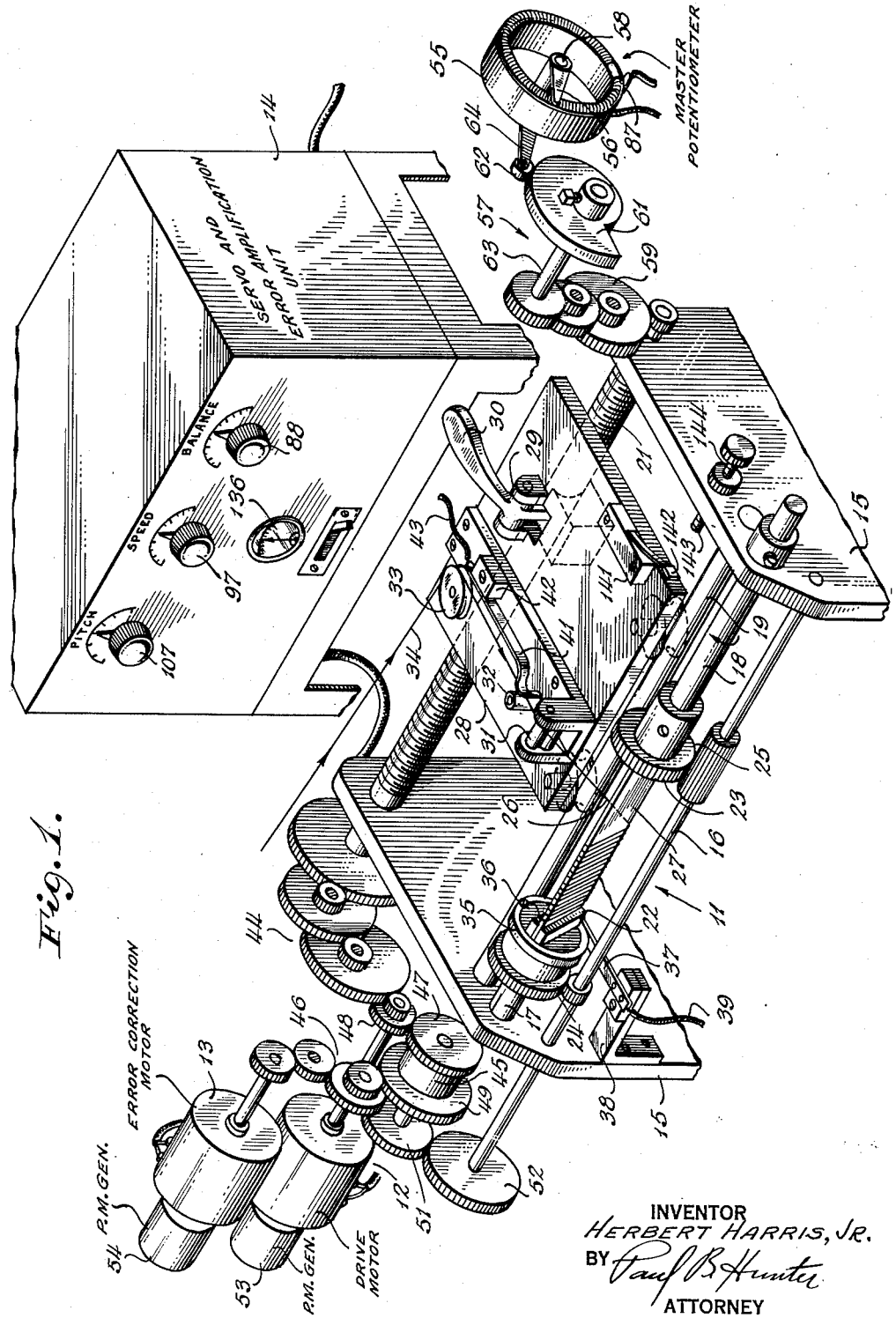

June 23, 1953

H. HARRIS, JR 2,643,068

POTENTIOMETER WINDER

Filed June 9, 1944

2 Sheets-Sheet 1

INVENTOR
HERBERT HARRIS, JR.
BY
ATTORNEY

Patented June 23, 1953

2,643,068

UNITED STATES PATENT OFFICE 2,643,068

POTENTIOMETER WINDER

Herbert Harris, Jr., Cedarhurst, N. Y., assignor to The Sperry Corporation, a corporation of Delaware Application June 9, 1944, Serial No. 539,412

4 Claims. (Cl. 242—9)

My invention relates to methods and apparatus for winding resistance cards for use with potentiometers, rheostats, and so forth.

An object of the invention is to provide accurate functional potentiometers including, for example, precisely linear potentiometers.

Another object is to provide apparatus for continuously measuring resistance and continuously comparing resistance of a rheostat or potentiometer card with a standard or master card while the card is being wound.

Still another object is to provide arrangements for automatically varying the winding pitch of a potentiometer as it is being wound in order to produce an accurate predetermined functional relationship between resistance and linear distance measured along the potentiometer.

Still another object is to provide arrangements for either varying the speed of rotation or varying the lead as a potentiometer is being wound in order to correct for any deviations from a predetermined functional resistance-distance relationship.

Still another object of the invention is to provide arrangements whereby potentiometers may be wound accurately even though the resistivity or the diameter of the resistance wire employed may not be uniform and winding forms employed may deviate from a specified shape and size as by the use of tapered cards. Furthermore, it is an object to provide potentiometers having accurate resistance values at each point and not merely accurate resistance ratios between various points.

A further object is to provide a speed control system in which the speed setting may readily be varied.

Another object is to provide an improved electronic motor speed control system.

Another object is to provide a motor speed control system responsive selectively to manual setting guided by a monitoring voltage or automatically responsive to variation in a quantity to be controlled.

Another object is to provide an automatic speed control system in which the load on the automatic control produced by a persistent error may be relieved by a manual control.

A further object is to provide combined manual and automatic pitch control.

Other and further objects, features and advantages of the invention will become apparent as the description proceeds.

Functional potentiometers have been employed in which a desired functional relationship between resistance and linear distance along the path of travel of the potentiometer brush or tap is obtained by a particular shape of potentiometer card. Similarly, where the functional relationship desired was linearity, a constant width potentiometer card has been employed. In the manufacture of such potentiometers, the attainment of exactness of the desired functional relationship has depended upon uniformity of the cards and of the resistance wire employed. Considerable difficulty has been experienced in obtaining accurate functional potentiometers for use where high precision is necessary. It is accordingly an object of my invention to provide improved more accurate functional potentiometers, and to provide improved methods and apparatus for exactly winding each potentiometer to specifications without leaving the attainment of the desired functional relationship to chance. It is, of course, immaterial whether the unit wound is to be used as a rheostat, or as a potentiometer in the strict literal sense. However, for convenience I have used the expression "potentiometer" in the description and claims broadly to signify any resistance unit which is to be produced with accurate resistances from point to point.

In carrying out the invention in its preferred form, a potentiometer winding machine is employed which may be of conventional design in so far as it employs conventional chucks for holding the card or other support on which resistance wire is to be wound together with a conventional lead screw arrangement for causing the wire to be fed to successively different points along the card or form on which it is being wound.

However, I also provide means for continuously measuring the resistance of the wire already wound on the card, and I provide a master potentiometer or card with means for moving its brush so as to produce a desired functional relationship between brush motion and resistance. For correcting any inaccuracies in the resistance of the potentiometer being wound, I provide means for comparing this resistance with that of the master potentiometer, and I provide a motor speed adjusting mechanism responsive to any unbalance for varying the ratio of lead speed to winding speed by varying either the speed of the lead screw or the speed at which the card holding chucks are driven, in order to vary the pitch of the potentiometer being wound. Preferably, the potentiometer to be wound is so designed that the clearance between successive turns of wire, which may be uninsulated wire, is about twice the thickness of the wire so that there is ample tolerance for variation in pitch to correct for any variations in resistivity or diameter of the wire. The card, cylinder or other form upon which the wire is wound may either be of uniform width or diameter or have an irregular shape according to the resistance function desired, but the winding form may be of uniform width even where nonlinear function is desired since the apparatus automatically adjusts the pitch to produce a desired functional relationship.

A better understanding of my invention will be afforded by the following detailed description considered in conjunction with the accompanying drawings and those features of the invention which are believed to be novel and patentable will be pointed out in the claims appended hereto.

Figure 2:
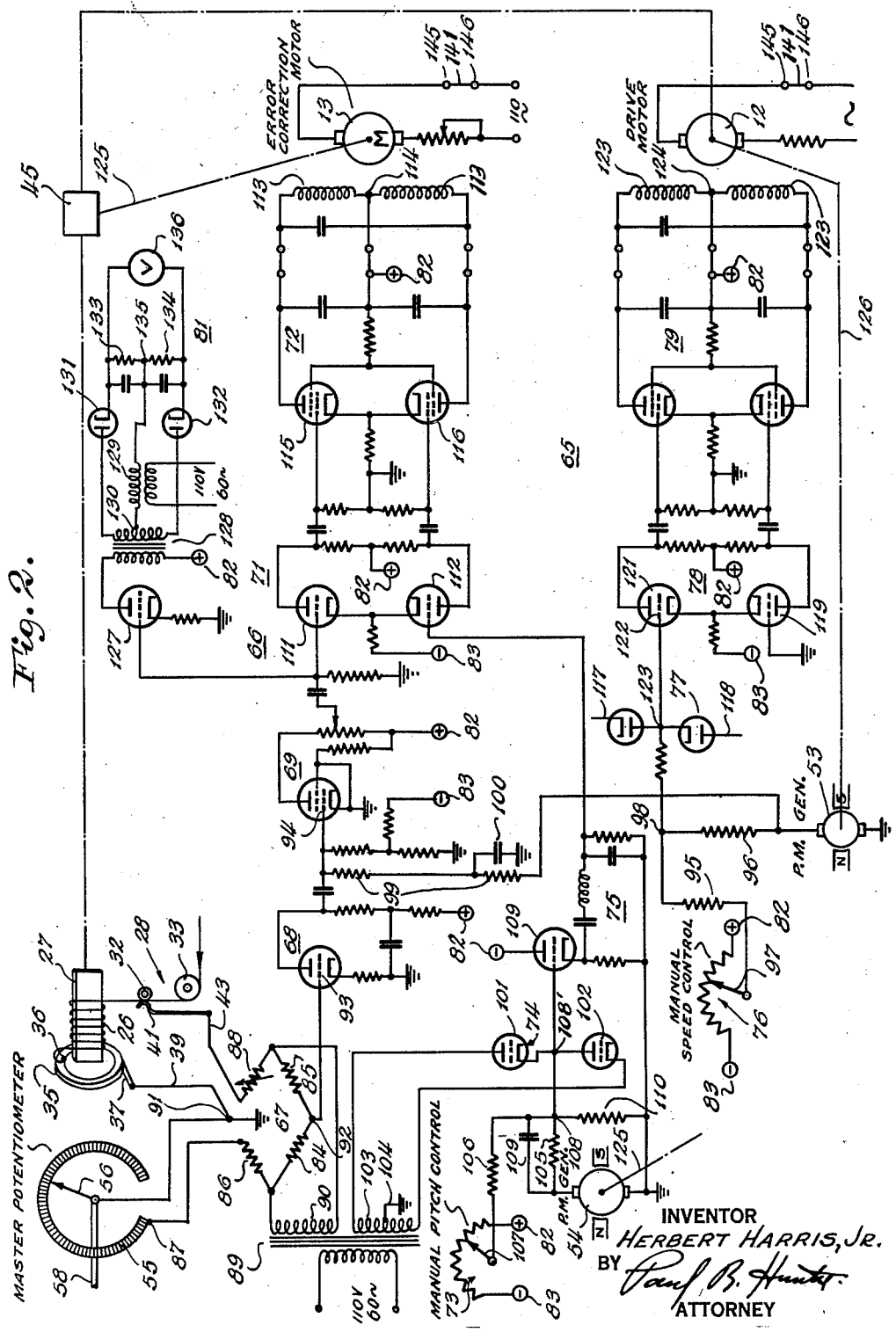

In the drawings,

Fig. 1 is a perspective view, partially schematic, and with portions of the apparatus omitted for clarity, illustrating one embodiment of the invention; and Fig. 2 is a circuit diagram of the apparatus of Fig. 1 with mechanical connections indicated schematically.

Like reference characters are utilized through the drawings to designate like parts.

The invention is by no means limited to the use of any particular type of winding apparatus or to the specific electric circuit arrangements shown by way of illustration. The invention is not limited to winding apparatus in which wire is wound upon a rotatable winding form instead of by a wire feed revolving about a stationary winding form, such as employed in connection with toroidal windings, for example. Nevertheless, for simplifying the explanation I have shown in the drawings a conventional rotating-winding-form type of winding machine modified and provided with additional attachments for the purpose of automatically controlling the resistance of the potentiometer being wound, thus illustrating one way of carrying out my invention.

The apparatus illustrated comprises a winding machine represented generally by the reference numeral 11, with a drive motor 12 and in addition thereto, an error correction motor 13 with electrical control apparatus 14. The latter is shown in Fig. 1 in its enclosing casing having electrical connections through cables, omitted for the sake of clarity, to the motors and potentiometers shown in the figure.

The winding machine 11 has conventional end plates 15 supporting a drive shaft 16, chuck shafts 17 and 18, a cross rod 19 and a lead screw 21. Card holding chucks 22 and 23 are mounted upon the shafts 17 and 18, respectively, and are mechanically connected to the drive shaft 16 through conventional gearing arrangements 24 and 25.

For feeding a bare resistance wire 26 and traversing it along a card or other winding form 27 composed of insulating material, a lead or wire feeding carriage 28 is provided which is movably supported upon the cross rod 19 and the lead screw 21. For causing the threads of the lead screw 21 to advance the wire feeding carriage 28, a suitable thread engaging mechanism 29 is provided, having a release lever 30.

A pair of rollers 31 is provided for passing the wire 26 to the card 27. For guiding the wire to the desired axial position with respect to the card 27, a vertical post 32 and a guide pulley 33 are provided. It is to be understood that the incoming length of wire 34 is drawn from a supply spool (not shown).

To enable electrical measurement of resistance to be made, the chuck 22 is preferably so constructed that it is electrically insulated from the gearing 24 and from the supporting chuck shaft 17, and a slip ring 35 is provided having a terminal screw 36 to which the end of the wire on the card 27 may be connected mechanically and electrically. For making slidable electrical connection to the slip ring 35, a metallic brush 37 is provided which is insulated from a supporting bracket 38 and has a conductor 39 electrically connected thereto.

For preventing the wire from being grounded to the winding apparatus, the rollers 31 are preferably composed of insulating material or are insulated from the supporting members, and the members 32 and 33 are likewise either insulated or composed of insulating material. For making electrical contact to the portion of the wire passing the post 32, a spring contact 41 is provided which is supported by means of an insulating block 42 and has a conductor 43 connected thereto. The conductors 39 and 43 are connected to suitable terminals within the control apparatus 14, as will be shown in connection with the discussion of Fig. 2.

The drive motor 12 is provided with suitable gearing 44 for directly driving the lead screw 21, and is also arranged to drive the drive shaft 16 through a differential 45. For varying the speed of the drive shaft 16 with respect to the lead screw 21 in order to adjust the pitch of the potentiometer being wound, the error correction motor 13 is also arranged to drive the drive shaft 16 through gearing 46 and the differential 45.

The differential 45 is one of the "in-line" shaft type, having an input shaft carrying a gear 47 driven by the drive motor 12 through a pinion 48, a second input shaft carrying a gear 49 driven by the error correction motor 13 through the gearing 46, and an output shaft carrying a gear 51, which is caused to rotate in the conventional manner of differential gearing at a speed equal to the algebraic difference in speed between the driven gears 47 and 49. For connecting the drive shaft 16 to the gear 51, a gear 52 is provided.

For enabling suitable speed control to be provided, the motors 12 and 13 may have two tachometers of the electrical type, such as permanent-magnet generators 53 and 54, respectively, mechanically connected thereto. It is to be understood that the motors 12 and 13 and the generators 53 and 54 have electrical connections to suitable terminals in the control apparatus 14, but these connections are omitted from Fig. 1 for simplicity of the drawing.

In order to enable the resistance of the potentiometer being wound on the card 27 to be checked continuously, a master potentiometer 55 is provided having a brush 56 and a suitable mechanical inter-linkage 57 to the lead screw 21 for causing the resistance of the potentiometer 55 to be varied progressively as wire is being fed onto the card 27 at a rate determined by the rate of rotation of the lead screw 21, which also represents the rate of axial travel along the potentiometer card 27.

If desired, the master potentiometer 55 may be a functional potentiometer having the desired function which is to be reproduced by the potentiometer being wound upon the card 27; and the linkage 57 may be such as to cause linear rotation of the brush 56 with respect to the lead screw 21. In this case, the brush 56 is carried by a shaft 58, which may be connected directly or through gearing such as gearing 59 to the lead screw 21.

However, in order to increase the flexibility of the apparatus and to enable the same very accurately and precisely wound master potentiometer 55 to be employed for checking resistance when winding potentiometers of different functional relationships, I find it convenient to provide a functional linkage and to make the potentiometer 55 exactly linear in its relationship between resistance and travel of the brush 56. To this end, a suitable linkage such as one comprising a cam 61 and a cam follower 62 may be provided. The cam 61, as shown, is carried by a shaft 63 connected through the gearing 59 to the lead screw 21, and the cam follower 62 is carried by an arm 64 secured to the potentiometer brush carrying shaft 58. If the master potentiometer 55 is precisely a linear potentiometer, any desired functional relationship for the potentiometer wound upon the card 27 may be obtained by a suitable contour of the cam 61. The same arrangement may be employed when the potentiometer is to be wound linearly, since in that case, the cam lift of the cam 61 may be made proportional to the rotation of the shaft 63 by shaping the cam 61 as a spiral. Replaceable cams of different apropriate contours are provided for the functions which may be desired in winding potentiometers.

The control apparatus 14 of Fig. 1 comprises electrical control circuits for the drive motor 12 and the error correction motor 13, designated generally by the reference numerals 65 and 66, respectively in Fig. 2.

As illustrated in Fig. 2, the electrical circuits 65 are arranged for causing the drive motor 12 to operate at a predetermined selected speed. The circuits 66 are arranged for causing the error correction motor 13 to operate at such a speed as to increase or decrease the speed of the drive shaft 16 sufficiently by acting through the differential 45 to cause whatever variation in pitch is required to prevent deviations from the desired functional relationship of the potentiometer being wound on the card 27.

The error correction motor control circuits 66 include a resistance measuring bridge 67, a bridge amplifier 68, an adjustable gain amplifier 69 for varying the amplifier output in accordance with variations in speed of the lead screw, a phase inverter and differential amplifier 71 and a pushpull power amplifier 72 for controlling the torque and direction of rotation of the error correction motor 13.

For relating the speed of the error correction motor 13 to a manually set normal speed adjustment, a pitch control potentiometer 73 may be provided with a modulator 74 acted upon jointly by the potentiometer 73 and the permanent magnet generator 54 and having an output connection through a filter 75 to the phase inverter and differential amplifier 71.

The electrical circuit 65 for controlling the drive motor 12 includes elements similar to some of those shown in the circuit 66, namely, a manual speed control potentiometer 76, a modulator 77 acted upon by the potentiometer 76 and the permanent-magnet generator 53, a phase inverter amplifier 78, and a pushpull connected power amplifier 79 controlling the torque of the drive motor 12.

If desired, an error monitoring circuit 81 may be provided.

For suitably energizing and biasing the amplifiers, positive and negative, or "B" and "C," power supply sources may be provided which are represented by positive terminals 82 and negative terminals 83, respectively.

The resistance-measuring Wheatstone bridge 67 includes the usual four arms and comprises a pair of standard ratio arms 84 and 85, an adjustable standard resistance arm consisting of a resistor 86 in series with the portion of the master potentiometer 55 between its end terminal 87 and its brush 56, and a variable or unknown resistance arm consisting of an initially balancing rheostat 88 in series with the wire 26 which has already been wound upon the potentiometer card 27.

For energizing the bridge 67, either alternating current or direct current may be employed, but in the arrangement illustrated, a 60-cycle central station source is employed, and a step-down transformer 89 is provided, having a secondary winding 90 connected to input terminals of the bridge 67. One of the diagonal-arm conjugate points 91 is grounded and the other diagonal-arm point 92 is connected to the bridge amplifier 68.

The amplifiers are of the electric discharge device type, such as triode and multigrid vacuum tubes, for example. The bridge amplifier 68 is shown as a triode having a grid 93 connected to the ungrounded diagonal arm point 92 of the resistance-measuring bridge 67, and having an output coupled to the amplifier 69.

The amplifier 69 has an input grid 94 coupled to the amplifier 68 and biased to a potential varying with the speed of the lead screw 21 (Fig. 1) for the purpose of making the gain of the amplifier 69 responsive thereto. The ungrounded brush of the lead screw speed measuring generator 53 is connected through resistors 99 to the grid 94 of the amplifier 69. For smoothing out fluctuations a by-pass condenser 100 is provided.

In order to stabilize the error correction motor 13 and prevent hunting, the pitch adjustment tachometer generator 54 may be coupled to the error motor control circuit 66 through the modulator 74 to introduce a correction proportional to motor speed.

The modulator 74 comprises a pair of rectifiers 101 and 102 connected in series to a winding of suitable voltage, such as a 50 volt winding 103 of the transformer 89, the center tap 104 of the winding 103 being grounded.

For producing a voltage the magnitude of which determines the speed of the error correction motor 13 when the pitch error is zero, there is provided a voltage divider comprising a resistor 105 and a resistor 106 connected in series between the ungrounded terminal of the permanent magnet generator 54 and the brush 107 of the manual pitch control potentiometer 73, which a junction terminal 108 connected to the junction terminal of the modulators 101 and 102. For anticipating errors by making the pitch adjusting speed correction proportional to acceleration of the error correction motor 13, the resistor 105 may be shunted by a condenser 109. In order to increase the relative effect of resistance error a resistor 110 may be connected between the terminal 108 and ground.

The junction terminal 108' of the modulator 74 is coupled to the filter 75 through a cathode follower 109.

The phase inverter amplifier 71 comprises a tube 111 coupled to the variable gain amplifier 69 and a tube 112 coupled to the filter 75. The tubes 111 and 112 are so connected as to give a differential output proportional to difference between the alternating-voltage output of the filter 75 and the output of the amplifier 69. The filter 75 is tuned to the frequency of the source supplying the transformer 89 in order to convert the output of the modulator 74 into a sine wave which may be opposed to the sine wave from the amplifier 69 in the phase inverter 71.

The error corrector motor 13 may be an alternating current motor of the servo type having a field winding 113 with a center tap 114. The winding 113 is connected between plates of the tubes 115 and 116 forming the pushpull power amplifier 72 coupled to the phase inverter amplifier. The center tap 114 is connected to the power supply positive terminal 82.

The modulator 77 is similar to the modulator 74 but may be connected to end terminals 117 and 118 of a conventional 6.3-volt filament-heating transformer winding (not shown) the connections of which are omitted for simplicity in the drawing, but which has the usual grounded center tap.

The phase inverter amplifier 78 comprises a tube 119 with a grounded grid and a tube 121 with a control grid 122 connected to the output or junction terminal 123 of the modulator 77. The power amplifier 79 is coupled to the phase inverter amplifier 78 similarly to the arrangement of amplifiers 72 and 71.

The drive motor 12 may also be an alternating current motor of the servo type having a field winding 123 differentially connected in the load circuits of the tubes constituting the amplifier 79, with a center tap 124 connected to the positive power supply terminal 82.

In the arrangement illustrated the lead-screw-speed-responsive tachometer generator 53 is also provided with a voltage divider, consisting of resistors 95 and 96 connected in series between the brush 97 of the manual speed-control potentiometer 76 and the ungrounded terminal of the generator 53. The resistors 95 and 96 have a junction terminal 98.

As represented schematically by the broken line 125, the error motor 13 is mechanically connected to the card 27 with the differential 45 interposed in this connection. The error motor 13 is also directly connected to the permanent magnet generator 54 but the mechanical connection is omitted in Fig. 2 for the sake of simplicity in the drawing.

As represented by the broken line 126, the drive motor 12 is directly connected to the permanent magnet generator 53 and is also connected by means (not shown in Fig. 2) to the mechanism for advancing the wire feeding carriage 28.

The potentiometer brush 56, it will be understood, is also driven by the drive motor 12 in accordance with the desired function represented by the linkage 57 in Fig. 1, omitted for the sake of simplicity from Fig. 2.

If desired for the protection of the machine a limit stop safety switch 141 may be provided which is supported by or suitably connected to the lead screw carriage 28 and carries a switch operating arm 142 adapted to engage a stop such as the tip 143 of a screw 144. As shown in Fig. 2, the switch 141 comprises a pair or pairs of normally-closed, relatively movable contacts 145 and 146 connected in suitable portion of the circuit such as in series with the main power supply to the drive motor 12 and the error motor 13.

When the machine is set up for automatically winding potentiometer wire on the card 27, the manual speed control potentiometer 76 is set at the position corresponding to the desired speed at which the lead screw 21 is to be driven, which also determines the normal speed of the drive shaft 16 assuming a normal diameter and resistivity of the wire 26. The gears 44 are chosen to give a speed ratio producing approximately the correct pitch if the wire 26 has the expected resistance per unit length. Assuming that the ungrounded brush of the generator 53 is at positive potential when the drive motor 12 is rotating forward, the speed adjusting brush 97 is set at a negative voltage substantially equalling (actually slightly exceeding) the voltage of the generator 53 at the desired speed. If the drive motor 12 should operate at a speed less than that corresponding to the position at which the brush 97 of the potentiometer 76 has been set, then the voltage produced by the permanent magnet generator 53 would be less than that supplied by the brush 97. The junction terminal 98 will fall so far below ground as to increase the square wave output of the modulator 77 accordingly. The modulator tubes are rendered conducting on alternate cycles of the alternating-current supply so as to connect the grid 122 to the grounded transformer mid-tap. Otherwise, the grid 122 is tied to the junction terminal 98. In this manner a square wave with a peak voltage dependent on the voltage of the terminal 98 is applied to the grid of tube 121. This increases the voltage swing of the grid 122 of the phase inverter amplifier 78, and increases the output of the amplifier 79 so as to increase the torque of the motor 12, and raise its speed until the potential of the junction terminal 98 has risen to the value at which the modulator output is just sufficient to produce adequate torque for driving the motor 12. This necessitates that the point 98 always remain slightly negative for the polarities of connections assumed.

In the event that the resistance measuring bridge 67 should be unbalanced by a deviation between the resistance of the potentiometer 55 and the wire 26, an alternating voltage will be supplied to the grid 93 of the bridge amplifier 68 and will be transmitted through the amplifier 69 to the grid 111 of the phase inverter amplifier 71. The gain of the amplifier however, will be adjusted according to the speed of the drive motor 12 and the generator 53, which determines the lead screw speed in order that correction will take place more rapidly when the apparatus is set for high pitch in the winding 26. The magnitude of the voltage supplied to the grid 93 depends on the magnitude of the error; and its phase (0 or 180°) depends on whether the lead screw speed is too fast or too slow.

Assuming first that the manual pitch control brush 107 is set at zero or ground voltage so that the manual pitch control is ineffective, the grid of the tube 112 will remain at ground potential. If there is no error in pitch, the voltage supplied to the grid of the tube 111 is zero and the latter grid also remains at ground potential being so biased by its grid leak. No voltage is supplied to the winding 113 of the error correction motor 13 and it remains stationary. Referring to Fig. 1, the gear 49 of the differential 45 remains stationary, and the gear 51 rotates at the speed of the gear 47. This is equivalent to a direct drive between the drive motor 12 and the card drive shaft 16. In case any error in resistance develops, however, a voltage appears at bridge 67 (Fig. 2) and the error correction motor 13 rotates forward or backward according to the phase of the error voltage. Acting through the differential 45, the motor 13 thus increases or decreases the speed of the drive shaft 16 sufficiently to correct the pitch and make the resistance of the potentiometer being wound conform to that of the master 55.

In order to avoid the necessity for many sets of gears 44 (Fig. 1) with different ratios for winding potentiometers with different pitches, the error correction motor may be allowed to run at a considerable speed in certain cases to correct the speed ratio. A large voltage output from the bridge 67 would be required in such cases, were the manual pitch control 73 not used. The use of manual pitch control, therefore, permits the retention of high sensitivity in the bridge 67 by relieving it of the necessity of supplying such large voltages and enables the apparatus to give finer pitch control.

The speed of the lead screw 21 comuputed as proper assuming expected resistivity and diameter of the wire 26, is set by means of the pitch-control potentiometer 73. The brush 107 is set at a voltage above or below ground depending in the desired direction of rotation of the motor 13. In case the error control motor 13 deviates from the speed corresponding to the pitch adjustment of the pitch control potentiometer 73, the permanent magnet generator 54 produces an output voltage above or below that of the brush 107 of the potentiometer 73, which determines the phase of the output of the modulator 74, thus causing the motor 13 to run in one direction or the other since its armature is supplied with current of fixed phase. The amplitude of the voltage also depends upon the magnitude of the deviation from preset speed. If the correct setting of the pitch adjustment 73 has been accurately estimated and the wire 26 remains uniform, the output of the bridge 67 is zero and the entire voltage for controlling the motor 13 is supplied through the modulator 74 and the tube 112. In the event of error, however, voltage appears at the bridge 67 and is supplied to the tube 111.

The phase inverter amplifier tube 111 acts in opposition to the tube 112 (or aiding according to the direction of error) and the net output is supplied to the amplifier 72 for increasing or decreasing the speed of the error correction motor 13.

The pitch motor speed has three components respectively proportional to (1) the manual pitch control voltage set by the brush 107 (2) the error in resistance (3) a rate voltage including an acceleration voltage. In other words the tachometer generator 54 must run with such speed and acceleration that the algebraic difference between the manual pitch control voltage and a voltage proportional to resistance error, balances voltages proportional to the speed and the acceleration of the generator 54. The proportion of the acceleration effect may be varied by varying the size of the condenser 109 and the proportion of the speed effect may be varied by varying the voltage division ratio of the resistors 105 and 110. The proportional effect of the manual pitch control voltage may be varied by varying the resistance of the resistor 106. The resistance error may be considered as an integrated error in pitch.

If it is desired to observe the magnitude and direction of the error which represents the deviation from computed resistance of the wire 26, the error monitor 81 may be employed, which comprises an input amplifier 127 coupled to the output of the variable gain amplifier 69 and having an output transformer 128 supplying a phase sensitive circuit consisting of a reference voltage source 129 and rectifiers 131 and 132 with condenser-shunted load resistors 133 and 134, having a junction terminal 135. The reference voltage source 129 is connected between the junction terminal 135 and the mid-terminal 130 of the transformer 128. A suitable direct-current-responsive instrument such as a center-zero volt meter or galvanometer 136 is connected across resistors 133 and 134 to indicate the polarity of the voltage across the resistors 133 and 134 which, in turn, represents the phase relationship between the voltage output of the amplifier 69 and the reference voltage source 129. The monitor 81 may be used to enable an operator to control the pitch manually if desired.

I have herein shown and particularly described certain embodiments of my invention and certain methods of operation embraced therein for the purpose of explaining its principle of operation and showing its application, but it will be obvious to those skilled in the art that many modifications and variations are possible, and I am, therefore, to cover all such modifications and variations as fall within the scope of my invention which is defined in the appended claims.

What is claimed is:

1. In a potentiometer winder having winding form rotating means and lead screw driving means, with means for varying the speed ratio between said winding form rotating means and said lead screw driving means to produce a predetermined resistance function of wire wound on the winding form, an adjustable gain amplifier for driving said ratio adjusting means, a generator coupled to said lead screw and adapted to produce an output that depends on the speed of said lead screw, and means for applying said output to said amplifier as a bias for varying the gain of said amplifier.

2. A motor speed control system comprising in combination with a motor, the speed of which is to be controlled, a tachometer generator driven thereby, a voltage source serving as a speed standard connected to said tachometer generator with a junction terminal, the potential of which is responsive to unbalance between the voltage source and the tachometer generator output, a motor control circuit connected to said motor and a thermionic modulator interposed between said junction terminal and said control circuit, thus supplying an output voltage, the magnitude of which is proportional to deviation between said voltage source and the output of said tachometer generator for varying the torque of the motor to adjust its speed in order to approach a balance between said tachometer generator and said voltage source.

3. In an automatic motor control circuit, an error responsive voltage source for supplying a voltage proportional to error for correcting motor speed, a phase inverter thermionic amplifier and a manually adjustable correcting voltage source, said phase inverter amplifier having input connections from said automatic error voltage source, and an output connection to the motor whereby the manual voltage source may be adjusted to supply sufficient voltage to correct expected or persistent errors and the automatic error voltage source may be relieved of load to the extent of the error voltage supplied by the manually adjusted source.

4. In a potentiometer winder having a master potentiometer and a rotatable winding form driven simultaneously with means for making electrical connections to the master potentiometer and the portion of the wire wound on the wire form, a resistance comparator connected to said electrical connections, a winding pitch control motor and an amplifier interposed between said resistance comparator and said motor for varying the operation of the motor in response to deviation between resistances of the master potentiometer and the portion of the wire wound upon the winding form, an anti-hunt generator mechanically connected to the pitch control motor and electrically coupled to the motor controlling amplifier, and a manual pitch adjustment comprising an adjustable voltage source electrically connected to balance out an adjustable voltage from the anti-hunt generator to supply a predetermined error correction voltage to the amplifier and thereby relieve the resistance comparator.

HERBERT HARRIS, Jr.

References Cited in the file of this patent

UNITED STATES PATENTS

| Number | Name | Date |
|---|---|---|
| 1,048,548 | Kramer | Dec. 31, 1912 |
| 1,057,008 | Phillips | Mar. 25, 1913 |
| 1,699,024 | Schnitzer | Jan. 15, 1929 |
| 2,319,413 | Leathers et al. | May 18, 1943 |